June 19, 1962  E. A. HARDEN ETAL  3,039,541
IMPLEMENT ATTACHMENT FOR TRACTOR
Filed Dec. 23, 1960  2 Sheets-Sheet 1

INVENTORS
Eldon A. Harden
Frederick M. Pierson
Paul O. Pierson
Atty.

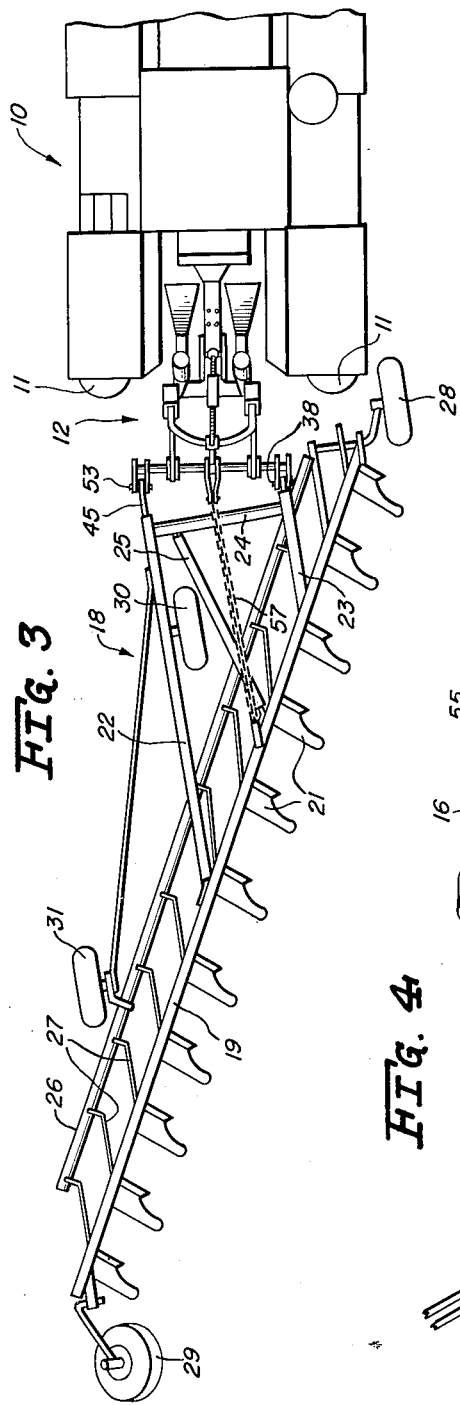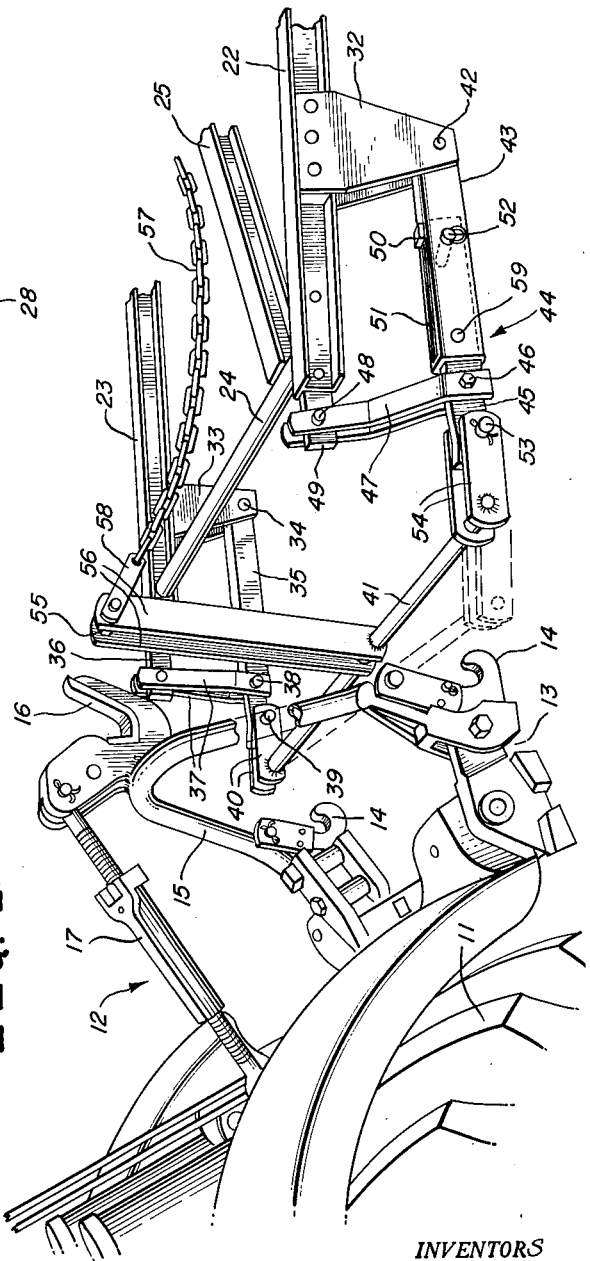

United States Patent Office 3,039,541
Patented June 19, 1962

3,039,541
IMPLEMENT ATTACHMENT FOR TRACTOR
Eldon A. Harden and Frederick M. Pierson, Naperville, Ill., assignors to International Harvester Company, Chicago, Ill., a corporation of New Jersey
Filed Dec. 23, 1960, Ser. No. 78,161
4 Claims. (Cl. 172—677)

This invention relates to agricultural implements and particularly to a multi-bottom plow of the type adapted to be connected to the rear of a tractor to be propelled thereby.

In a moldboard plow of the type with which this invention is concerned, the plow bottoms are mounted on a wheel supported frame arranged diagonally of the path of travel and extending from a location near one of the rear drive wheels of the tractor rearwardly to a location laterally outwardly of the track made by the other rear drive wheel. This broad span of the implement as compared with the width of the tractor creates problems in transporting the plow through gates, on roadways and the like, and an object of this invention is to provide an improved plow incorporating novel means therein facilitating the transportation of the implement.

Another object of the invention is to provide an improved hitch structure for the connection of a multi-bottom plow or the like to the rear of a tractor, wherein a stable connection between plow and tractor is made at laterally spaced locations to hold the implement in its operating position with the rear ends thereof projecting laterally beyond one side of the tractor, one of the connections of the plow to the tractor being extensible to allow the plow to swing laterally about the other connection to a position with the laterally projecting part of the plow in line behind the tractor.

Another object of the invention is to provide, in an implement having laterally spaced points of connection to the tractor, telescoping means in one of said connections allowing the plow to swing laterally about the pivot axis of the other connection, and means for locking the telescoping means in its closed or operating, and in its extended or transport position.

Other objects and advantages of the invention will become clear from the following detailed description when read in conjunction with the accompanying drawings wherein:

FIGURE 3 is a plan view showing the relationship of the implement to the tractor in the transport position thereof; and FIGURE 4 is a perspective view on an enlarged scale showing the mechanism by which the implement is attached to the tractor.

Figure 1:
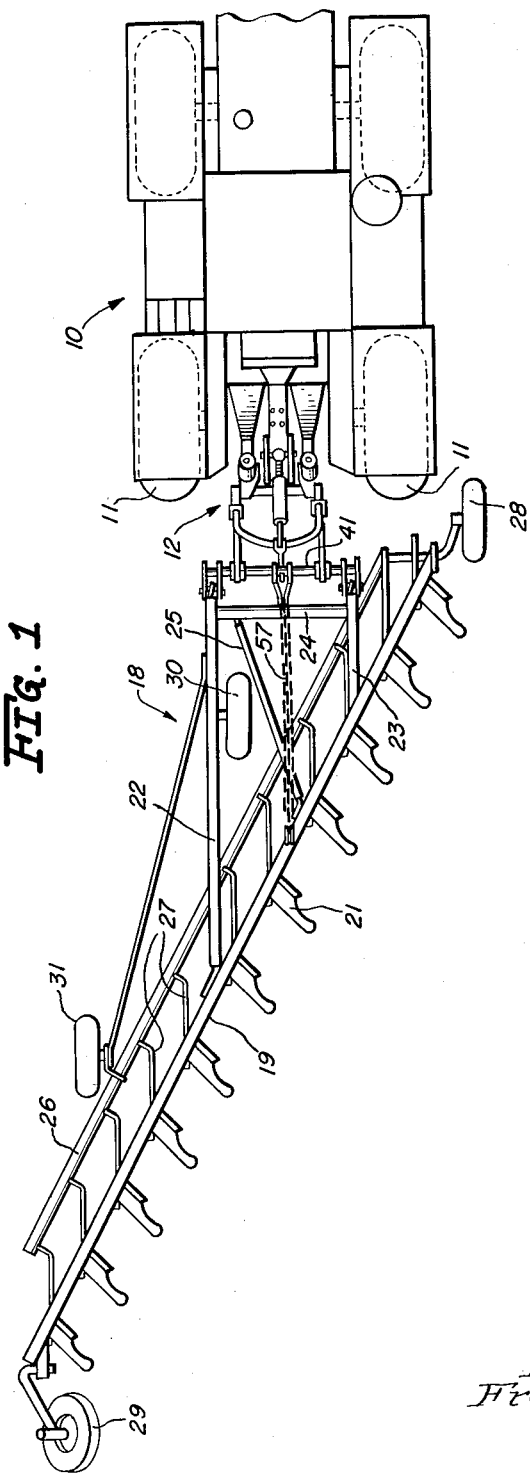
FIGURE 1 is a diagrammatic plan view of a tractor having an implement attached thereto incorporating the features of this invention, and showing the operating position of the implement.

For the purposes of this invention it may be understood that the tractor 10 by which the implement of this invention is propelled is of well known construction having rear drive wheels 11 and a drawbar structure 12. The drawbar structure 12 includes a lower draw frame 13 having laterally spaced hook-like members 14 connected by a vertically extending yoke 15 having secured to its central upper portion another hook 16 to which is pivotally connected the forward end of a link 17, the rear end of which is pivotally connected to the tractor and forms part of a three-point hitch which can be raised and lowered by means, not shown, deriving power from the tractor.

The frame of the plow is designated by the numeral 18 and includes an elongated beam 19 extending diagonally of the path of travel from a location near the right hand tractor drive wheel 11, diagonally rearwardly, and in the operating position of FIGURE 1, terminates at a location a substantial distance laterally of the tractor. Beam 19 has secured thereto a plurality of standards 20 to the lower ends of which are secured plow bottoms 21.

Also forming a part of the plow frame 18 are laterally spaced beams 22 and 23, the rear ends of which are affixed to beam 19 and extend forwardly generally parallel to the direction of travel in the operating position of FIGURE 1, beam 22 being substantially longer than beam 23. The forward ends of beams 22 and 23 are connected by a transverse brace 24, and another brace 25 connects the brace 24 with beam 19. Also forming part of the frame 18 is another beam 26, parallel to beam 19 and connected thereto by bars 27. The plow frame is supported by wheels 28, 29, 30 and 31.

Figure 2:
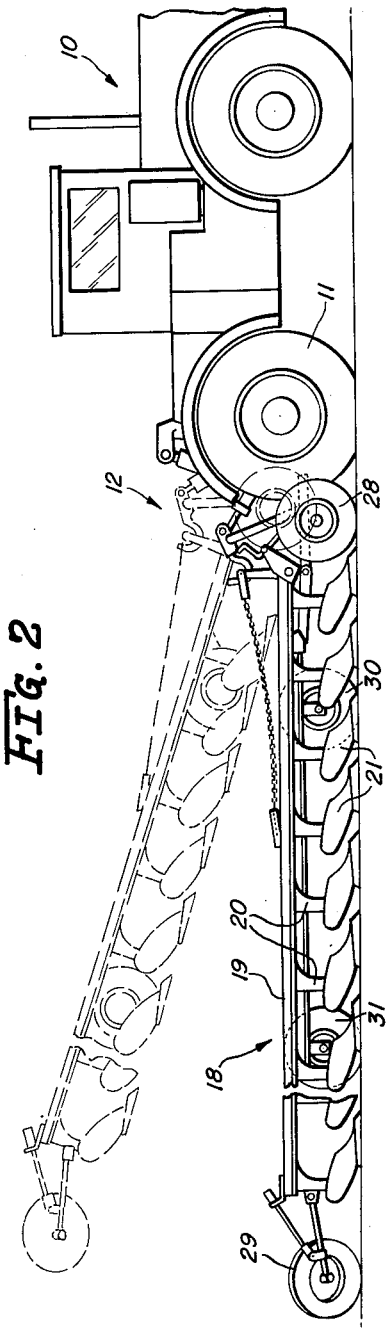
FIGURE 2 is a view in side elevation of the structure shown in FIGURE 1 and illustrating in dotted lines the raised or transport position of the implement.

The plow shown in the drawings is a direct connected plow which is picked up bodily by the tractor, as shown in dotted lines in FIGURE 2, for transport. The plow is laterally stable in its operating position as shown in FIGURE 1, and maintains a relatively fixed position with respect to the tractor, the rear part of the plow projecting laterally a substantial distance beyond one side of the tractor so that the total area covered by the implement is considerably greater than that of the tractor, rendering passage through gates and over roadways difficult.

In FIGURE 4, for clarity, the implement is shown separated from the hitch mechanism of the tractor. Brackets 32 and 33 form a part of the plow frame and are affixed to and depend, respectively, from beams 22 and 23, rearwardly of the forward ends of said beams. The brackets 32 and 33 consist of laterally spaced plates and the lower end of bracket 33 carries a pivot pin 34 upon which is mounted the rear end of a right hand pull bar 35 which, for the purposes of this invention, is a single bar which extends forwardly from the bracket 33 below and parallel to the forward end of beam 23 and projecting forwardly therefrom. An extension 36 of beam 23 has pivotally connected thereto the upper end of a link 37 comprising spaced straps, the lower ends of which are pivotally mounted upon a pin 38 carried by the forward portion of bar 35.

The forward end of bar 35 beyond pin 38 is bent laterally at an angle to the direction of travel when the plow is in the operating position of FIGURE 1, and is provided with an oversized aperture to receive a pivot pin 39 mounted in the rear ends of a pair of lugs 40 affixed to and extending rearwardly from the right hand end of a transverse draft bar 41 which, in the operating position of the implement as shown in FIGURE 1, is parallel to frame brace 24.

On the left hand side of the implement, the lower end of bracket 32 is provided with a pivot pin 42 upon which is mounted the rear end of a tubular socket member 43 forming part of a hitch member in the form of a pull bar parallel to right hand pull bar 35 and designated by the numeral 44. Left hand pull bar 44 also includes a forward section in the form of a shaft 45 pivotally connected by a bolt 46 to the lower end of a link 47 comprising spaced straps, the upper ends of which are pivotally connected by a bolt 48 to an extension 49 of beam 22.

Shaft 45 is slidably receivable in socket 43 and has affixed to its upper edge adjacent the rear end of the shaft a stop bar 50 engageable with the rear edge of a slot 51 formed in the upper face of the tubular member 43.

The position of the parts shown in FIGURE 4 corresponds to the operating position of the plow with the stop 50 against the rear edge of slot 51. In this position, a locking pin 52 is receivable in registering openings in socket 43 and shaft 45 to hold the front section 45 and rear section 43 of the hitch member 44 rigidly against relative sliding movement.

The forward end of shaft 45 is bent laterally similarly to the forward end of pull bar 35 in the operating position of the plow and is provided with an oversized aperture to receive a pivot pin 53, the connection of pin 53 to the end of shaft 45 and of pin 39 to the end of pull bar 35 being of such a nature as to accommodate pivoting of members 35 and 44 relative to the lugs 40 and 54, the latter having their rear ends mounted upon pin 53 and their forward ends affixed to the left hand end of draft bar 41.

In connecting the implement to the tractor, the hitch structure 12 of the tractor is manipulated so that the ends of bar 41 between the sets of lugs 40 and 54 are received in the hook members 14. At the same time, a pin 55 at the upper end of a pair of uprights 56, the lower ends of which are affixed centrally to drawbar 41, is received in the upper hook 16 of the tractor hitch. A lifting chain 57 has at its forward end a clevis 58 mounted upon pin 55, and the rear end of the chain is connected to tool beam 19.

During operation of the implement, chain 57 is slack to permit the implement to follow the contour of the ground, but when the tractor hitch 12 is elevated to raise the implement, the chain 57 becomes taut and forms an integral part of the lifting mechanism by which the implement is raised above the ground to the transport position indicated in dotted lines in FIGURE 2.

In order to facilitate passage of the tractor and the implement through gates and along roadways, the plow frame is swung laterally about the pivot axis of the connection between pin 39 and pull bar 35 on the right hand side of the path of the tractor, and this is accomplished by releasing the locking pin 52 from the registering openings in shaft 45 and socket 43 from the fully telescoped position of FIGURE 4 to the extended position indicated in FIGURE 3. This extension of the length of hitch member 44 causes link 47 to swing forwardly and the implement to swing laterally to the position indicated in FIGURE 3 with the rear end of the plow frame generally in alignment with the track made by the tractor 10. In this position, the stop 50 abuts the forward edge of slot 51, in which position another opening 59 in the forward portion of socket 43 registers with the aperture in the rear portion of shaft 45 and pin 52 is inserted therein to lock these parts in the transport position of the implement.

It is believed that the function and operation of the novel plow structure of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In an implement adapted for connection to the rear of a tractor having a width in the operating position thereof greater than that of the tractor and extending a substantial distance laterally to one side of the path of travel of the tractor, a tool-carrying frame, laterally spaced hitch elements at the forward end of the frame, means forming a pivotal connection between one of said hitch elements and the tractor on the side thereof opposite that beyond which the implement projects to accommodate lateral swinging of the implement from its operating position to a transport position with the laterally projecting part thereof generally in longitudinal alignment with the tractor, the hitch element on the other side of the tractor comprising a longitudinally extending hitch member below and generally parallel to the forward end of the frame and including relatively slidable front and rear sections, means pivotally connecting the rear section to said frame on a transverse axis, a link pivotally connected at its upper end to the frame for forward and rearward swinging and at its lower end to said front section to accommodate swinging of the latter therewith and sliding movement thereof relative to said rear section, and means for locking said sections together in a position corresponding to the operating position of the implement, said locking means being releasable to accommodate relative sliding of said sections and said lateral swinging of the implement.

2. The invention set forth in claim 1, wherein said rear section of the hitch member is in the form of a tubular socket and said front section is a shaft slidably receivable in said socket, said socket and shaft members having registering apertures, and a locking pin being selectively insertable in said apertures when the implement is in its operating and transport positions.

3. In an implement attachment for the rear of a tractor wherein the implement projects laterally a substantial distance beyond one side of the tractor during operation, the combination with a tractor drawbar having laterally spaced attaching elements thereon, of a wheel-supported implement frame, a pair of laterally spaced complementary implement attaching elements on the forward end of the frame, means pivotally connecting one of said implement attaching elements to the associated drawbar attaching element on the side opposite the side of the tractor from beyond which the implement projects, said pivotal connecting means including means accommodating lateral swinging of the implement relative to said drawbar, the other of said complementary implement attaching elements comprising a longitudinally elongated telescoping member pivotally connected at its forward end to the other of said drawbar attaching elements by means accommodating lateral swinging of said telescoping member relative to the drawbar, a longitudinally elongated relatively stationary socket member carried by the implement frame and adapted to slidably receive said telescoping member to accommodate said lateral swinging of the implement to a position generally in line with the tractor, and means cooperable between said socket member and said telescoping member adapted to lock them against relative sliding movement.

4. The invention set forth in claim 3 wherein each of said drawbar attaching elements includes a transverse pivot pin carried by the drawbar and each of said implement attaching elements includes a portion having an oversized aperture therein adapted to receive said pivot pin, said apertured portion being disposed at an angle to the direction of travel of the implement during operation thereof and swingable therewith to a position generally parallel to the direction of travel.

References Cited in the file of this patent
UNITED STATES PATENTS

| | | |
|---|---|---|
| 2,609,742 | Love | Sept. 9, 1952 |
| 2,658,770 | Koenig | Nov. 10, 1953 |
| 2,704,019 | Altgelt | Mar. 15, 1955 |
| 2,797,627 | Anderson | July 2, 1957 |